(12) United States Patent
Shetty (10) Patent No.: US 11,928,371 B2
(45) Date of Patent: Mar. 12, 2024

(54) 3D PRINTING VERIFICATION USING AUDIO SNIPPETS

(71) Applicant: VMware LLC, Palo Alto, CA (US)

(72) Inventor: Rohit Pradeep Shetty, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 455 days.

(21) Appl. No.: 17/011,009

(22) Filed: Sep. 3, 2020

(65) Prior Publication Data

US 2022/0011989 A1 Jan. 13, 2022

(30) Foreign Application Priority Data

Jul. 8, 2020 (IN) .............................. 202041029086

(51) Int. Cl.
*G06F 3/12* (2006.01)
*G05B 19/4099* (2006.01)

(52) U.S. Cl.
CPC ....... *G06F 3/1222* (2013.01); *G05B 19/4099* (2013.01); *G06F 3/1238* (2013.01); *G06F 3/1274* (2013.01); G05B 2219/49023 (2013.01)

(58) Field of Classification Search
CPC ...... G05B 19/4099; G05B 2219/49023; G06F 3/1222; G06F 3/1238; G06F 3/1274
See application file for complete search history.

(56) References Cited

U.S. PATENT DOCUMENTS

| | | | | |
|---|---|---|---|---|
| 2009/0256087 A1* | 10/2009 | Engler | ............... | H04N 1/00047 271/278 |
| 2015/0153981 A1* | 6/2015 | Iwasaki | .............. | H04N 1/00344 358/1.14 |
| 2017/0057170 A1* | 3/2017 | Gupta | ................ | G05B 19/4099 |
| 2018/0162066 A1* | 6/2018 | Bruwer | .............. | G05B 19/4099 |
| 2019/0155557 A1* | 5/2019 | Shirai | .................... | G06F 3/1247 |
| 2019/0178755 A1* | 6/2019 | Lee | ......................... | B33Y 50/00 |
| 2019/0213338 A1* | 7/2019 | Zonouz | ................ | B29C 64/393 |
| 2019/0310809 A1* | 10/2019 | Sekine | .................. | G06F 3/1235 |

OTHER PUBLICATIONS

Al Faruque, Mohammad Abdullah, et al. "Acoustic side-channel attacks on additive manufacturing systems." 2016 ACM/IEEE 7th international conference on Cyber-Physical Systems (ICCPS). IEEE, 2016. (Year: 2016).*
Belikovetsky, Sofia, et al. "Digital audio signature for 3D printing integrity." IEEE Transactions on Information Forensics and Security 14.5 (2018): 1127-1141. (Year: 2018).*
Gatlin, Jacob, et al. "Detecting sabotage attacks in additive manufacturing using actuator power signatures." IEEE Access 7 (2019): 133421-133432. (Year: 2019).*

* cited by examiner

*Primary Examiner* — Robert E Fennema
*Assistant Examiner* — Vi N Tran
(74) *Attorney, Agent, or Firm* — King Intellectual Asset Management (57) ABSTRACT

Systems and methods for 3D printer management can verify the printing of a 3D object based on instructions inserted into the 3D object file that cause the 3D printer to perform extra actions, thus emitting certain sounds while printing. In one example, a print server can receive a request to print a 3D object. The print server can insert snippets of instructions at random into the 3D object file. A recording device can record audio of the 3D printer printing the 3D object. The recording device can send the audio to the print server. The print server can verify that the audio emitted by the 3D printer while printing the 3D object match up with the snippets inserted into the 3D object file.

20 Claims, 5 Drawing Sheets

3D PRINTING VERIFICATION USING AUDIO SNIPPETS

RELATED APPLICATIONS

Benefit is claimed under 35 U.S.C. 119(a)-(d) to Foreign Application Serial No. 202041029086 filed in India entitled "3D PRINTING VERIFICATION USING AUDIO SNIPPETS", on Jul. 8, 2020, by VMware, Inc., which is herein incorporated in its entirety by reference for all purposes.

BACKGROUND

Three-dimensional ("3D") printers are increasingly prevalent within enterprise environments. Workers can use 3D printers to print objects as part of their job. For example, 3D printing can speed the process of product development by allowing workers to print multiple prototypes in a short amount of time. Printed protypes can be tested and workers can change the object until an optimal design is reached. The object itself can be, for example, a computer-aided design ("CAD") file, an STL file, an OBJ file, or some other file type that describes 3D shape information (e.g., geometry) and is recognized by 3D printers.

However, 3D printers are often connected to a network, which makes them subject to hacking attempts. Serious problems can arise where a hacker accesses a 3D printer and alters the design of 3D printing jobs. The 3D printer jobs can be modified without users knowing. This can cause confusion and require extensive resources to figure out what is wrong with these 3D printing jobs. To protect against this, 3D design files are usually cryptographically secured, and employees are asked to rely on only internally approved and stored designs.

However, even these methods have not stopped hackers from intruding into systems. Hackers connected to the network can still potentially make slight alterations to designs, such as by modifying a printing instruction file at the 3D printer. This can result in potentially catastrophic harm. For example, an altered part used in a car could cause the car to crash. Similarly, an altered structural element could fail much more easily than a user realizes. Current systems are mostly defenseless to this type of attack.

As a result, a need exists for a method of verifying that a 3D printing job was executed properly.

SUMMARY

Examples described herein include systems and methods for verifying 3D printing jobs using audio snippets. In an example, a print server can receive a print request from a user device. In one example, the request can include an object for 3D printing. Alternatively, the request can identify an object stored on the server or a separate storage device. The print request can also identify the user device making the request. The print server can be a separate device from the 3D printer or can execute virtually using a processor of the 3D printer, in different examples.

A service executing on the print server can insert snippets of audio code (audio snippets) into the printing instruction file (hereinafter "G-code") of the object. The audio snippets can include instructions that cause a 3D printer to execute certain movements, and those movements can cause the 3D printer to emit certain sounds. The audio snippets can be retrieved from a saved set of snippets in an example. Alternatively, the service can generate random audio snippets after receiving the request. In one example, the service can also add an expiration timestamp to the object. The 3D printer can be configured to reject a printing job with an expired timestamp.

The print server can send the object to the 3D printer for printing. Alternatively, the print server can send the object back to the user device, which can then send the object to the 3D printer. The print server can also send instructions to a recording device located near the 3D printer to begin recording audio. The recording device can record audio of the 3D printer printing the object and send an audio file of the print job to the print server. In one example, the recording device can upload the audio to the print server in real-time as the printing occurs.

In an example, the service on the print server can compare the received audio file to the audio code. This can include verifying the that the 3D printer executed the audio snippet instructions correctly and at the right times. Specific time intervals in the audio file can be checked for specific sounds correlating to the audio code. If the audio file and audio code properly match, then the service can verify that the object was printed correctly. In one example, the service can notify the user device of the verification. If the service determines that the audio file and audio code do not properly match, then the service can notify the user device that the print job could not be verified. In one example, the print server can receive audio of the printing in real time. The service can compare the audio as it is received, and if at any point during the printing the service determines that the print job cannot be verified, the service can send instructions to the 3D printer to stop printing the object.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods for 3D printer management and verification are described herein. An example system can verify the printing of a 3D object based on instructions inserted into the 3D object file that cause the 3D printer to perform extra actions, thus emitting certain sounds while printing. In one example, a print server can receive a request to print a 3D object. The print server can insert snippets of instructions at random into the 3D object file. A recording device can record audio of the 3D printer printing the 3D object. The recording device can send the audio to the print server. The print server can verify that the audio emitted by the 3D printer while printing the 3D object match up with the snippets inserted into the 3D object file.

Figure 1:
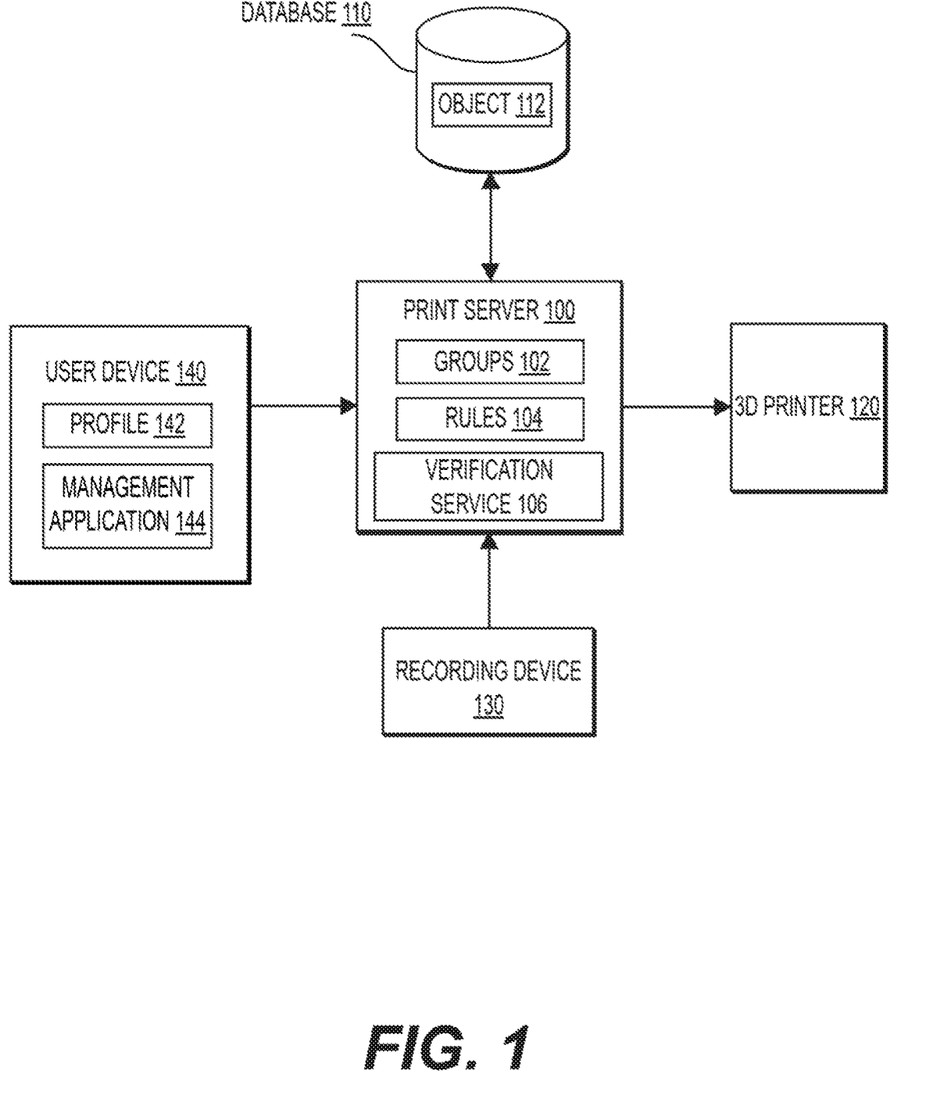
FIG. 1 is an illustration of an example system for verifying 3D printing jobs using audio snippets.

FIG. 1 is an illustration of a system for verifying 3D printing jobs using audio snippets. In this system, a print server 100 is utilized to route a print request from a user device 140 to a 3D printer 120. The user device 140 can be one or more processor-based devices, such as a personal computer, tablet, or cell phone. The print server 100 can be a single server or a group of servers, including multiple servers implemented virtually across multiple computing platforms. In an example, the print server 100 can be part of a unified endpoint management ("UEM") system. The print server 100 can ensure that printing of the object is allowed. To do this, the print server 100 can execute an agent that reviews the object 112 that is part of the print request from the user device 140. The user device 140 can be associated with a profile 142 that allows the print server 100 to determine which rules 104 apply to the user device 140. The rules 104 can include lists (i.e., whitelists or blacklists) to apply to object classifications. The rules 104 can also include maximum extrusion materials or print times for certain users or organizational groups 102. Different jobs or roles can be categorized into different groups 102, with those groups 102 having different 3D printing permissions and limitations. For example, an engineering group 102 can use more extrusion materials than a sales group 102. The profile 142 can specify one or more groups 102 associated with the user, in an example.

When the user device 140 requests printing, the object 112 can be sent to the print server 100 as part of a file. In one example, the print server 100 can retrieve the object 112 from a database 110 that stores object files. As an example, the UEM can have rules in place that only allow the 3D printer 120 to print approved objects. Approved objects can be stored in the database 110 that is only accessible from approved devices, such as the print server 100. In order to print the object 112, the user device 140 must send a request to the print server 100, which in turn retrieves the object 112 from the database 110. The object 112 can be a file type for a 3D object. As some examples, the object 112 can be a computer-aided design (CAD) file, a stereolithography (STL) file, or a Virtual Reality Modeling Language (VRML) file. Alternatively, the object 112 can be a file written in a computer numerical control (CNC) programming language for computer-aided design, such as G-code. Although references are made herein to G-code to describe the CNC programming language of the 3D printer 120, those references are merely used as examples and are not intended to be limiting in any way. For example, G-code can encompass any CNC programming language, such as .x3g files.

The print server 100 can include a verification service 106 that is responsible for verifying 3D print jobs. In an example, after the print server 100 approves a print job, the verification service 106 can insert snippets of audio code into the G-code code of the object 112. In the context of the present disclosure, the audio code can be a set of instructions that causes the 3D printer 120 to execute movements of certain motion components. These instructions are referred to as "audio code" because a 3D printer emits various sounds as it prints. The sound emitted depends on the component being moved and the speed at which is moves. For example, many 3D printers use a 3-axis system to print objects, including x, y, and z axes. Each axis can have a one or a set of motors to execute motion along that axis. Each motor can emit a unique sound, and the sound can change depending on the speed at which the motor operates. The sounds made by specific types of 3D printers can be pre-recorded and categorized with respect to different movements specified by the audio code.

The audio code, therefore, can be a set of instructions that cause the 3D printer 120 to execute a set of movements, and those movements can cause the 3D printer 120 to emit a certain set of sounds. In one example, the audio code can be inserted into the object 112 file in such a way that it does not negatively affect the printing of the object 112. A recording device 130 can be positioned near the 3D printer 120 and record audio of the 3D printer printing the object 112. The recording device 130 can be any device that includes a microphone. The recording device can also record video in one example. In another example, the recording device can be built into the 3D printer 120.

The recording device 130 can send the audio to the print server 100. The verification service 106 can compare the audio received from the recording device 130 to the audio code, or alternatively to the object 112 file with the audio code inserted.

In some examples, the user device 140 can include a management application 144. The management application 144 can be a stand-alone application, part of an enterprise application, or part of an operating system of the user device 140. The management application 144 can be part of an enterprise UEM system that manages and secures user devices that are enrolled with the enterprise. For example, the management application 144 can be responsible for ensuring that user devices are up to date with compliance and security settings prior to accessing UEMS data and resources. Example compliance standards can include ensuring a device is not jailbroken, that particular encryption standards are used in enterprise data transmission, that the device does not have certain blacklisted applications installed or running, and that the device is located within a geofenced area when accessing certain enterprise resources.

The management application 144 can also manage 3D printing jobs associated with the user device 140. For example, a UEM system can require that the management application 144 communicate with the print server 100 and perform certain actions to verify a printing job. In one example, the object file 112 can be held on the user device 140 instead of the database 110, and the UEM system can require the management application 144 to send the object file 112 to the print server 100 for approval. The print server 100 can approve the object 112 and insert audio code using methods described herein. In some examples, the print server 100 can also sign the object 112 with a digital signature, such as a code signature. The print server 100 can then send the object 112 either back to the user device 140 or directly to the 3D printer 120. The 3D printer can use the digital signature to verify that the print server 100 has approved the object 112 for printing.

Figure 2:
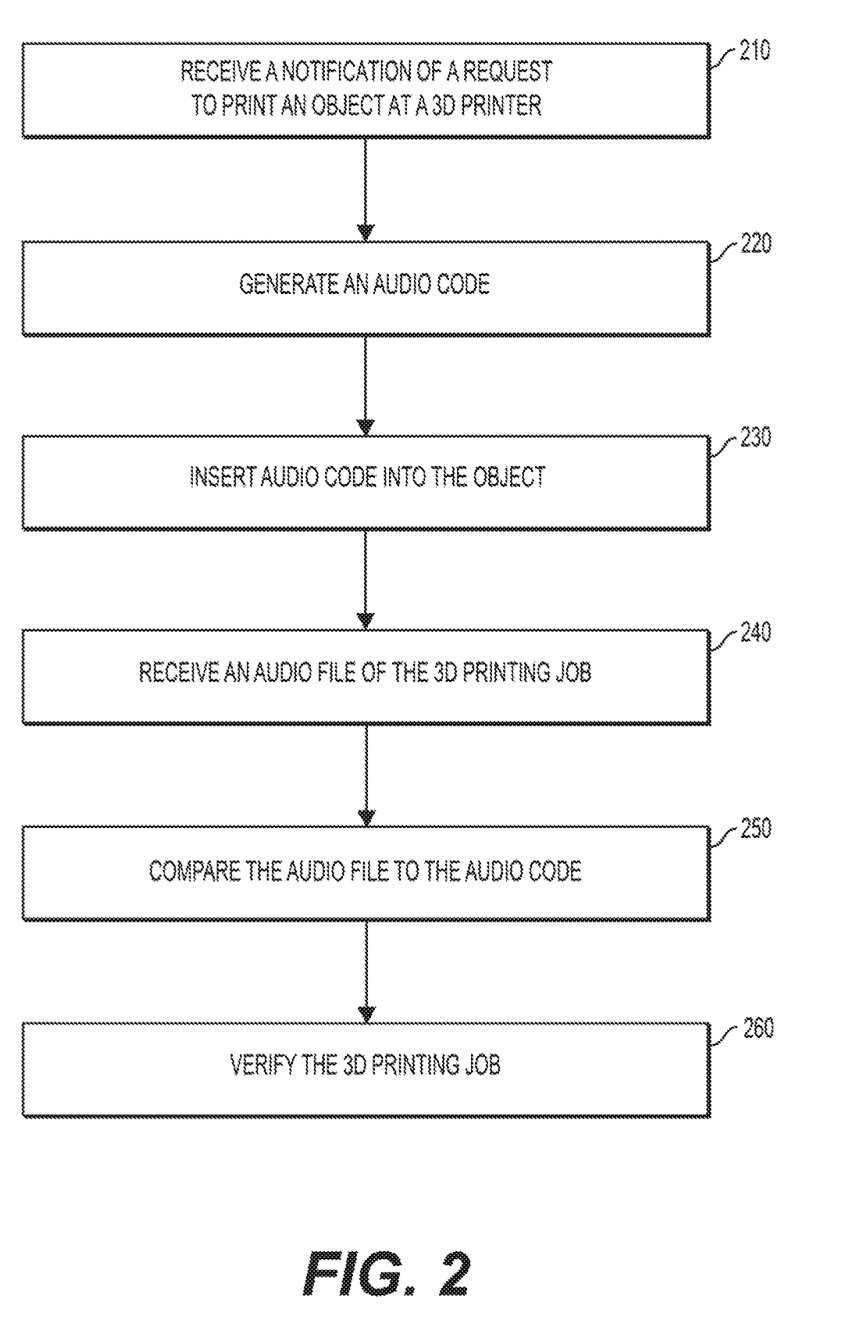
FIG. 2 is a flowchart of an example method for verifying 3D printing jobs using audio snippets.

FIG. 2 is a flowchart of an example method for verifying 3D printing jobs using audio snippets. At stage 210, the print server 100 can receive a notification of a request for an object 112. The request can be to print object 112 on the 3D printer 120. In one example, the request can include the object 112. For example, a UEM can require that all 3d printing jobs be approved at the print server 100, and a user can send the object 112 from the user device 140 to the print server 100 along with the printing request. In another example, the object 112 can be stored on a secure storage device, such as database 110. In response to the request, the print server 100 can retrieve the object 112 from the database 110.

At stage 220, the print server 100 can generate an audio code. In one example, this stage can be performed by the verification service 106. The audio code can include a set of instructions that cause the 3D printer 120 to execute a set of movements. In an example, the audio code can be composed of multiple snippets. A snippet can be a subset of unique movement instructions. In one example, the print server 100 can have a collection of snippets stored that it can pull from to insert into the object 112. Alternatively, the print server 100 or verification service 106 can include an algorithm for generating audio snippets. The print server 100 can then generate random audio snippets after receiving the request.

In one example, each audio snippet can return the movement components of the 3D printer 120 to their pre-audio snippet positions. Additionally, while the 3D printer 120 is executing the audio snippet instructions, it can activate the movement components without printing any material. This can allow the 3D printer 120 to execute the instructed movements from the audio snippets and return to printing the object 112 without affecting the printed object 112.

At stage 230, the print server 100 can insert the audio code into the object 112. This can include modifying the object 112 to include the movement instructions in the audio code. In one example, the audio code can include multiple audio snippets, and the audio snippets can be inserted into the object 112 at different locations of its G-code. The placement of the audio snippet in the G-code can affect when the 3D printer 120 executes the audio snippet. For example, the 3D printer 120 can execute G-code instructions in sequential order, and the print server 100 can insert the audio snippets at specific locations in the G-code so that it knows when each audio snippet should be executed during the print job.

At stage 240, the print server 100 can receive an audio file of a 3D printing job of the object 112. In an example, the audio file can be an audio recording of the 3D printer 120 printing the object 112. The audio file can be any file type with an audio coding format, such as an .mp3, .m4a, or .wav file.

In one example, the audio file can include audio of the entire printing job of the object 112. Alternatively, the audio file can be streamed to the print server 100 in real-time. In an example, the recording device 130 can record the 3D printer 120 printing the object 112 and send an audio file of the recording to the server 100.

As an example, the print server 100 can send the object 112 to the 3D printer 120 with instructions to print the object 112. The print server 100 can also send instructions to the recording device 130 to begin an audio recording. The recording device 130 can include a microphone and be located near the 3D printer 120. As the 3D printer 120 prints the object 112, the recording device 130 can record the audio emitted by the 3D printer 120. In one example, the recording device 130 can upload the audio file to the print server 100 as it records. This can allow the print server 100 to receive and analyze the audio as the printing occurs. Alternatively, the recording device 130 can record audio of the printing until the print job is completed. The recording device 130 can then send the complete audio file to the print server 100 for analysis. At stages 250 and 260, the print server 100 can verify the 3D printing job. In one example, these stages can be executed by the verification service 106. Verifying the print job at stage 260 can include comparing the audio file to the audio code at stage 250. If the audio file indicates that the 3D printer 120 executed the audio code correctly and at the correct times, then the print server 100 can verify the print job. Otherwise, the print server 100 can determine that the print job may have been tampered with and should not be used.

In an example, the print server 100 can store information relating to the timing of the 3D printer 120 printing the object 112. Such information can include how long the entire printing job should take and how long each instructional step in the G-code should take, for example. The print server 100 can use the information to determine when the 3D printer 120 should execute each audio snippet instruction relative to the starting time of the print job. Because 3D printer models print at different speeds, the timing information can be specific to the model of the 3D printer 120.

Likewise, the specific sounds being checked based on the audio code can vary according to the model of the 3D printer. These sounds can be stored in a database and can vary for different types of 3D printers. The sounds can be retrieved and then compared against the audio file at time intervals where the movements are expected based on where the audio code appears in the object file. Audio comparison can be accomplished using modules programmed or trained for determining similarity of sounds.

Using the timing information, the print server 100 can ensure that the audio snippet instructions were executed properly and at the correct times during the printing. For example, for each inserted audio snippet the print server 100 can verify that the 3D printer 120 emitted the correct sequence of sounds. However, because G-code files can be quite large and include thousands of instructions, a hacker likely may change a part of the G-code file that does not correspond to an audio snippet. For this reason, the print server 100 can also check the time interval between the printing of each audio snippet. If the time interval falls outside an allowable threshold, then the server can determine that the G-code file may have been tampered with.

In some examples, the print server 100 can receive the audio file and verify the print job as the printing occurs. For example, the recording device 130 can stream audio of the 3D printer 120 to the print server 100 as the printing occurs. The print server 100 can then compare the streaming audio to the audio code in real time. If at any point the print server 100 determines that the audio does not match the audio code, the print server 100 can instruct the 3D printer 120 to stop the print job. In one example, the print server 100 can also send a notification to the user device 140 indicating that the print job could not be verified. In one example, the print server 100 can also notify an administrator so that appropriate measures can be taken to determine whether the 3D printer has been hacked. Alternatively, in an example where the print job can be verified, the print server 100 can notify the user device 140 accordingly.

In some examples, the print server 100 can also receive a video file of the printing. The video file can be any file type with a video coding format, such as an .avi, .mp4, or .wmv file. The print server 100 can receive both file types in an example. The print server 100 can analyze the movements of the 3D printer using the video file to determine whether the 3D printer movements match up with the audio code. In one example, the print server can analyze the video if the audio comparison drops below a threshold similarity. Alternatively, the print server 100 can analyze the video file such that the movements can be compared regardless of the audio comparison meeting a threshold similarity.

Figure 3:
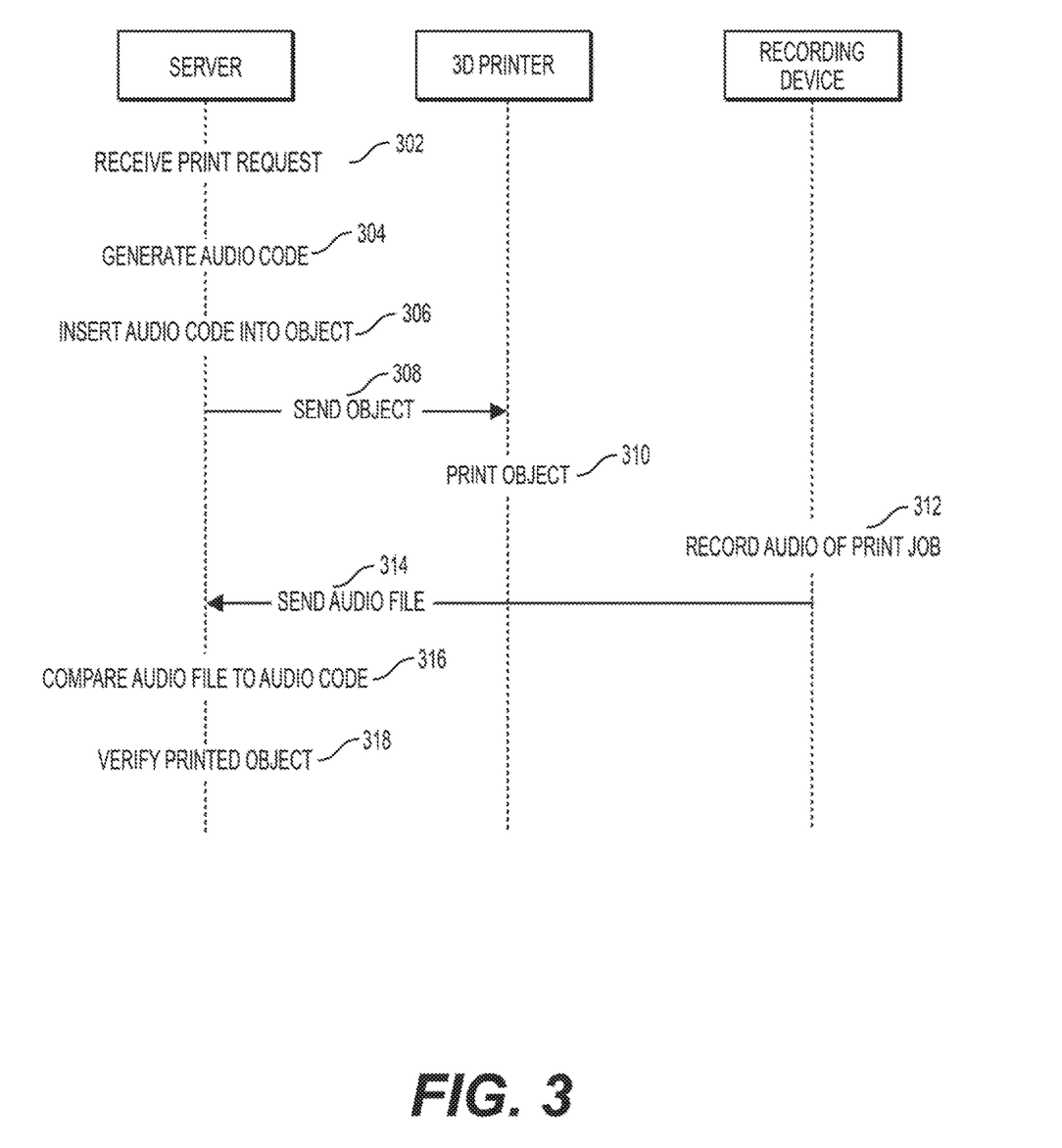
FIG. 3 is a sequence diagram of an example method for verifying 3D printing jobs using audio snippets.

FIG. 3 is a sequence diagram of an example method for verifying 3D printing jobs using audio snippets. At stage 302, the server 110 can receive a request for the object 112. The request can be to print object 112 on the 3D printer 120. In one example, the request can include the object 112. In an example, the print server 100 can be part of a UEM and responsible for managing 3D printing jobs. For example, the print server 100 can keep a list of approved object files that users may print on a 3D printer. Alternatively, the print server 100 may allow 3D printing objects except for blacklisted objects. However, the UEM may require that users send an object to the print server 100 before printing. As an example, the 3D printer 120 can be configured to communicate with the management application 144 on the user device 140 to handle 3D printer jobs. In one example, the 3D printer 120 can be configured to accept 3D printing requests only from the print server 100. In this example, the request can include the object 112 or the request can indicate the object 112 as the object to be printed, and the print server 100 can retrieve the object 112 from the database 110.

At stage 304, the print server 100 can generate an audio code. The audio code can include a set of instructions that cause the 3D printer 120 to execute a set of movements. In an example, the audio code can be composed of multiple snippets. In one example, the print server 100 can have a collection of snippets stored that it can pull from to insert into the object 112. Alternatively, the print server 100 or verification service 106 can include an algorithm for generating audio snippets. The print server 100 can then generate random audio snippets after receiving the request.

In one example, each audio snippet can return the movement components of the 3D printer 120 to their pre-audio snippet positions. Additionally, while the 3D printer 120 is executing the audio snippet instructions, it can activate the movement components without printing any material. This can allow the 3D printer 120 to execute the instructed movements from the audio snippets and return to printing the object 112 without affecting the printed object 112.

At stage 306, the print server 100 can insert the audio code into the object 112. This can include modifying the object 112 to include the movement instructions in the audio code. In one example, the audio code can include multiple audio snippets, and the audio snippets can be inserted into the object 112 at different locations of its G-code. The placement of the audio snippet in the G-code can affect when the 3D printer 120 executes the audio snippet. For example, the 3D printer 120 can execute G-code instructions in sequential order, and the print server 100 can insert the audio snippets at specific locations in the G-code so that it knows when each audio snippet should be executed during the print job.

At stage 308, the print server 100 can send the object 112 to the 3D printer 120. In one example, the print server 100 and 3D printer 120 can be part of a UEM. For security reasons, the UEM can restrict the 3D printer 120 so that it can only receive printing files from approved servers, such as server 100. In another example, the print server 100 can encrypt the object 112 with a private key before sending the object 112, and the 3D printer 120 can have a public key that allows it to decrypt the object 112. The 3D printer 120 can then print the object 112 at stage 310.

At stage 312, the recording device 130 can record audio of the 3D printer 120 printing the object 112. The recording device 130 can also generate an audio file of the printing. The audio can be recorded with any file type with an audio coding format, such as an .mp3, .m4a, or .wav file. In another example, the recording device 130 can record video of the printing and generate a video file of the printing. The video file can be recorded with any file type with a video coding format, such as an .avi, .mp4, or .wmv file. In some examples, the record device 130 can record both audio and video.

At stage 314, the recording device 130 can send an audio file of the recording to the print server 100. In one example, the audio file can include audio of the entire printing job of the object 112. Alternatively, the audio file can be streamed to the print server 100 in real-time. In an example, the recording device 130 can record the 3D printer 120 printing the object 112 and send an audio file of the recording to the print server 100.

In an example, the print server 100 can send instructions to the recording device 130 to begin an audio recording when it sends the object 112 to the 3D printer 120 with instructions to print the object 112. The recording device 130 can include a microphone and be located near the 3D printer 120. As the 3D printer 120 prints the object 112, the recording device 130 can record the audio emitted by the 3D printer 120. When the print job is completed, the recording device 130 can send the audio file to the print server 100.

At stage 316, the print server 100 can verify the printed object. In one example, this step can be executed by the verification service 106. Verifying the print job can include comparing the audio file to the audio code. If the audio file indicates that the 3D printer 120 executed the audio code correctly and at the correct times, then the print server 100 can verify the print job. Otherwise, the print server 100 can determine that the print job may have been tampered with and should not be used.

In an example, the print server 100 can store information relating to the timing of the 3D printer 120 printing the object 112. Such information can include how long the entire printing job should take and how long each instructional step in the G-code should take, for example. The print server 100 can use the information to determine when the 3D printer 120 should execute each audio snippet instruction relative to the starting time of the print job. Because 3D printer models print at different speeds, the timing information can be specific to the model of the 3D printer 120.

Using the timing information, at stage 318 the print server 100 can ensure that the audio snippet instructions were executed properly and at the correct times during the printing. For example, for each inserted audio snippet the print server 100 can verify that the 3D printer 120 emitted the correct sequence of sounds. However, because G-code files can be quite large and include thousands of instructions, a hacker likely may change a part of the G-code file that does not correspond to an audio snippet. For this reason, the print server 100 can also check the time interval between the printing of each audio snippet. If the time interval falls outside an allowable threshold, then the server can determine that the G-code file may have been tampered with.

Figure 4:
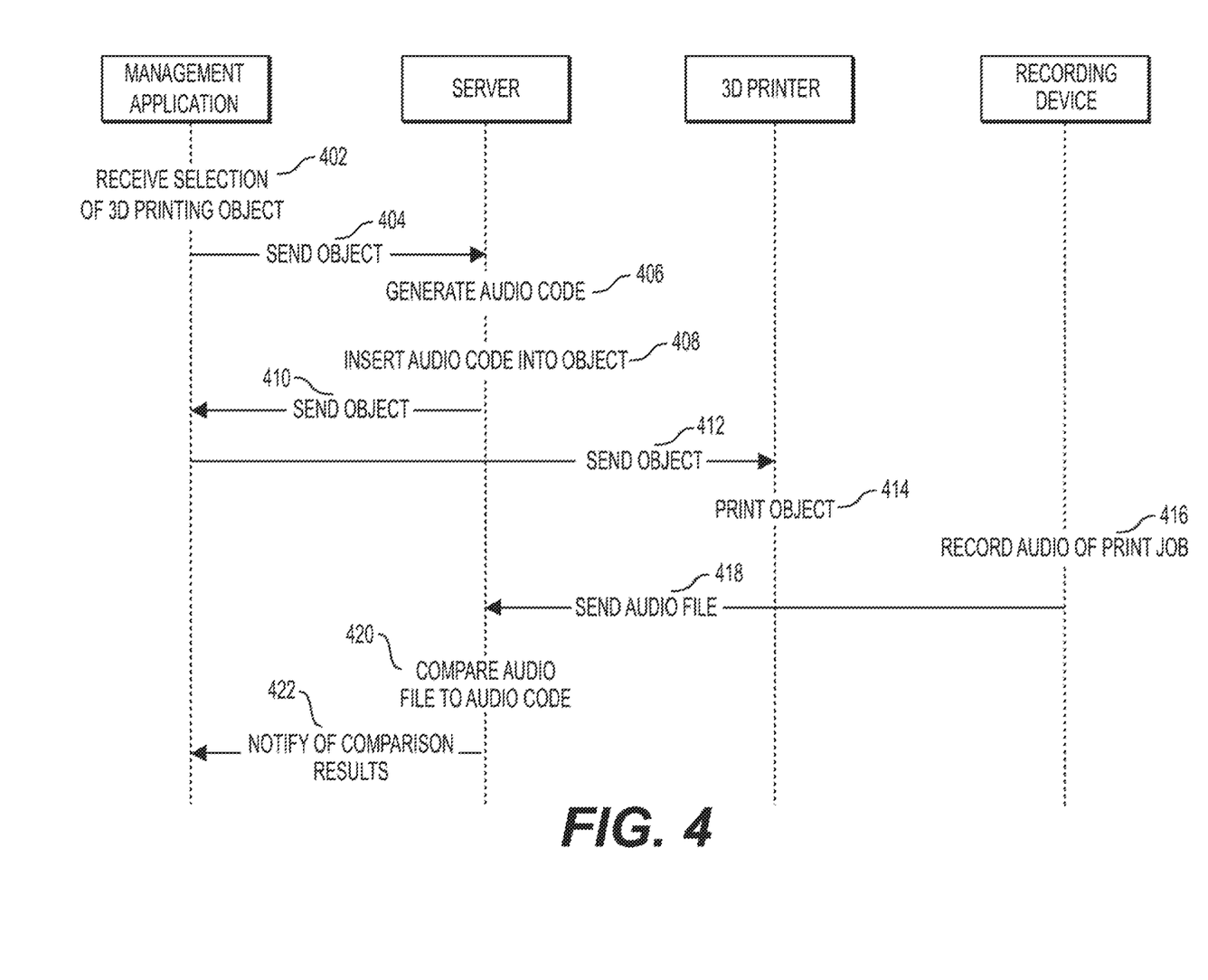
FIG. 4 is a sequence diagram of another example method for verifying 3D printing jobs using audio snippets.

FIG. 4 is a sequence diagram of another example method for verifying 3D printing jobs using audio snippets. At stage 402, the management application 144 can receive a user selection of the object 112 on the user device 140. As an example, the user device 140 can be enrolled in a UEM for which the print server 100 is a part. The print server 100 can be responsible for managing 3D printing jobs. For example, the print server 100 can keep a list of approved object files that users may print on a 3D printer. Alternatively, the print server 100 may allow 3D printing objects except for blacklisted objects. However, the UEM may require that users send an object to the server print 100 before printing. As an example, the 3D printer 120 can be configured to communicate with the management application 144 on user devices to handle 3D printer jobs. In one example, the 3D printer 120 can be configured to accept 3D printing requests only from approved sources, such as the management application 144 or the print server 100. In one example, the object 112 can be a 3D printing file already saved on the print server 100 or the database 110. Alternatively, the object 112 can include the 3D printing file of the object 112.

At stage 404, the management application 144 can send the object 112 to the print server 100. In an example, the management application 144 can be configured to do this in response to a user selecting the object 112 for printing. For example, the UEM can require that objects be sent to the print server 100 prior to printing to that the print server 100 can perform the steps described herein to verify the printing job.

Accordingly, at stage 406, the print server 100 can generate an audio code. The audio code can include a set of instructions that cause the 3D printer 120 to execute a set of movements. In an example, the audio code can be composed of multiple snippets. In one example, the print server 100 can have a collection of snippets stored that it can pull from to insert into the object 112. Alternatively, the print server 100 or verification service 106 can include an algorithm for generating audio snippets. The print server 100 can then generate random audio snippets after receiving the request.

In one example, each audio snippet can return the movement components of the 3D printer 120 to their pre-audio snippet positions. Additionally, while the 3D printer 120 is executing the audio snippet instructions, it can activate the movement components without printing any material. This can allow the 3D printer 120 to execute the instructed movements from the audio snippets and return to printing the object 112 without affecting the printed object 112.

At stage 408, the print server 100 can insert the audio code into the object 112. This can include modifying the object 112 to include the movement instructions in the audio code. In one example, the audio code can include multiple audio snippets, and the audio snippets can be inserted into the object 112 at different locations of its G-code. The placement of the audio snippet in the G-code can affect when the 3D printer 120 executes the audio snippet. For example, the 3D printer 120 can execute G-code instructions in sequential order, and the print server 100 can insert the audio snippets at specific locations in the G-code so that the print server 100 knows when each audio snippet should be executed during the print job. The print server 100 can randomly generate and store the timing information that drives audio code placement, in an example.

At stage 410, the print server 100 can send the object 112 with the inserted audio code to the management application 144. In one example, the object 112 can include a digital signature, such as a code signature, from the print server 100. Such a signature can be used by the 3D printer 120 can verify that the print server 100 approved printing of the object 112. In another example, the object 112 can include an expiration timestamp. The expiration timestamp can be used as a security measure. For example, the 3D printer 120 can reject printing requests after the time on the expiration timestamp to ensure that the request is current. In an example, the time frame allotted for printing can be set by an administrator.

At stage 412, the management application 144 can send the object 112 to the 3D printer 120. In one example, the 3D printer 120 can verify the object 112 before beginning the print job. This can include verifying the server's 100 digital signature, as an example. At stage 414, the 3D printer 120 can print the object 112.

At stage 416, the recording device 130 can record audio of the 3D printer 120 printing the object 112. The recording device 130 can also generate an audio file of the printing. The audio can be recorded with any file type with an audio coding format, such as an .mp3, .m4a, or .wav file. In another example, the recording device 130 can record video of the printing and generate a video file of the printing. In some examples, the record device 130 can record both audio and video.

At stage 418, the recording device 130 can send an audio file of the recording to the print server 100. In one example, the audio file can include audio of the entire printing job of the object 112. Alternatively, the audio file can be streamed to the print server 100 in real-time. In an example, the recording device 130 can record the 3D printer 120 printing the object 112 and send an audio file of the recording to the print server 100.

In an example, the print server 100 can send instructions to the recording device 130 to begin an audio recording when it sends the object 112 to the 3D printer 120 with instructions to print the object 112. The recording device 130 can include a microphone and be located near the 3D printer 120. As the 3D printer 120 prints the object 112, the recording device 130 can record the audio emitted by the 3D printer 120. When the print job is completed, the recording device 130 can send the audio file to the print server 100.

At stage 420, the print server 100 can compare the audio file to the audio code. If the audio file indicates that the 3D printer 120 executed the audio code correctly and at the correct times, then the print server 100 can verify the print job. Otherwise, the print server 100 can determine that the print job may have been tampered with and should not be used. In an example, the print server 100 can store information relating to the timing of the 3D printer 120 printing the object 112. Such information can include how long the entire printing job should take and how long each instructional step in the G-code should take, for example. The print server 100 can use the information to determine when the 3D printer 120 should execute each audio snippet instruction relative to the starting time of the print job. Because 3D printer models print at different speeds, the timing information can be specific to the model of the 3D printer 120.

Using the timing information, the print server 100 can ensure that the audio snippet instructions were executed properly and at the correct times during the printing. For example, for each inserted audio snippet the print server 100 can verify that the 3D printer 120 emitted the correct sequence of sounds and/or executed the correct sequence of movements. However, because G-code files can be quite large and include thousands of instructions, a hacker likely may change a part of the G-code file that does not correspond to an audio snippet. For this reason, the print server 100 can also check the time interval between the printing of each audio snippet. If the time interval falls outside an allowable threshold, then the server can determine that the G-code file may have been tampered with.

At stage 422, the print server 100 can notify the management application 144 of the comparison results. In turn, the management application 144 can notify a user in an interface on a display of the user device 140. The notification can indicate whether or not the print job could be successfully verified.

Figure 5:
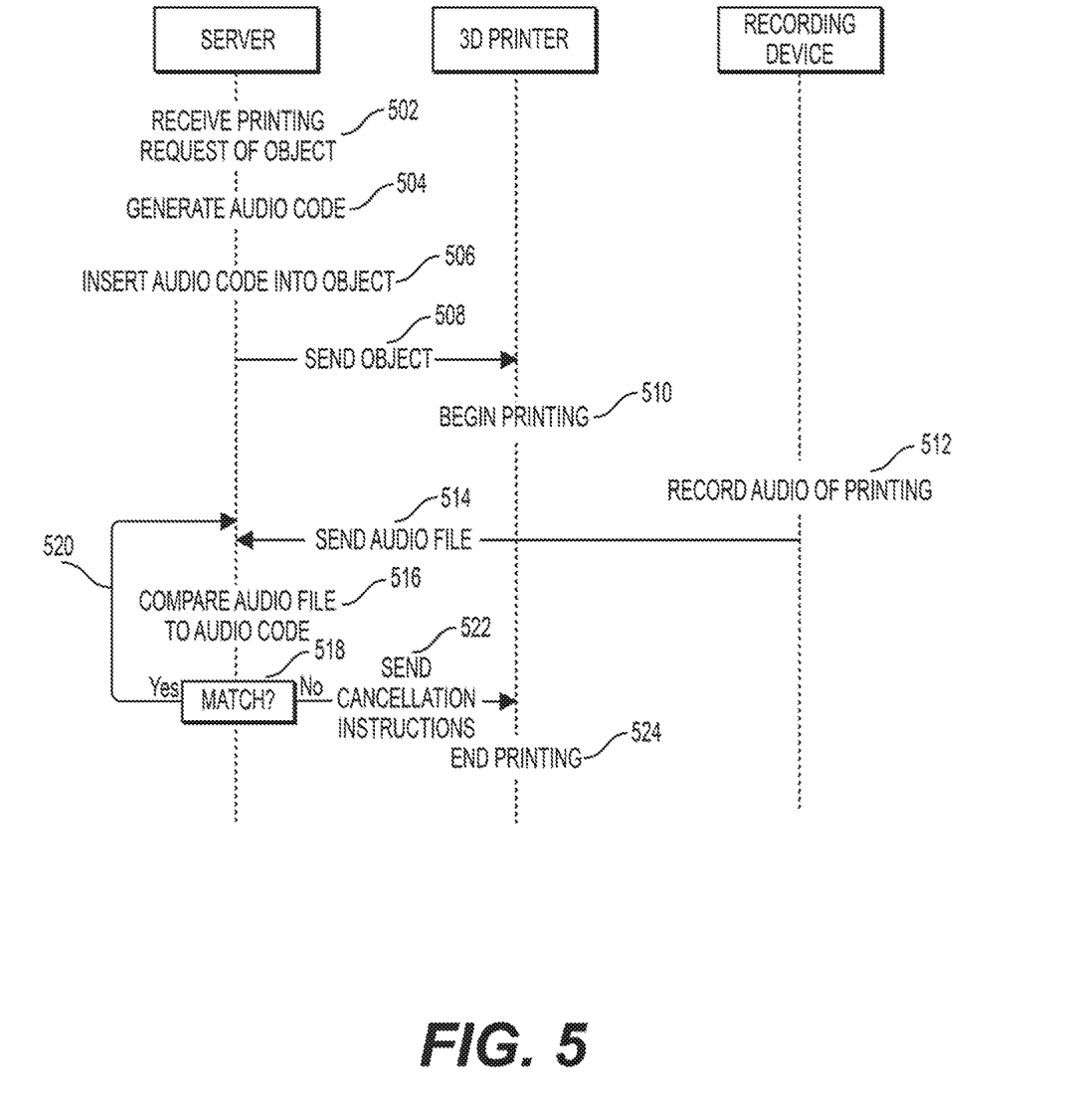
FIG. 5 is a sequence diagram of another example method for verifying 3D printing jobs using audio snippets.

FIG. 5 is a sequence diagram of another example method for verifying 3D printing jobs using audio snippets. At stage 502, the print server 100 can receive a request to print object 112. The request can be to print object 112 on the 3D printer 120. In one example, the request can include the object 112.

In an example, the print server 100 can be part of a UEM and responsible for managing 3D printing jobs. For example, the print server 100 can keep a list of approved object files that users may print on a 3D printer. Alternatively, the print server 100 may allow 3D printing objects except for blacklisted objects. However, the UEM may require that users send an object to the print server 100 before printing. As an example, the 3D printer 120 can be configured to communicate with the management application 144 on user devices to handle 3D printer jobs. In one example, the 3D printer 120 can be configured to accept 3D printing requests only from the print server 100. In this example, the request can include the object 112 or the request can indicate the object 112 as the object to be printed, and the print server 100 can retrieve the object 112 from the database 110.

At stage 504, the print server 100 can generate an audio code. The audio code can include a set of instructions that cause the 3D printer 120 to execute a set of movements. In an example, the audio code can be composed of multiple snippets. In one example, the print server 100 can have a collection of snippets stored that it can pull from to insert into the object 112. Alternatively, the print server 100 or verification service 106 can include an algorithm for generating audio snippets. The print server 100 can then generate random audio snippets after receiving the request.

In one example, each audio snippet can return the movement components of the 3D printer 120 to their pre-audio snippet positions. Additionally, while the 3D printer 120 is executing the audio snippet instructions, it can activate the movement components without printing any material. This can allow the 3D printer 120 to execute the instructed movements from the audio snippets and return to printing the object 112 without affecting the printed object 112.

At stage 506, the print server 100 can insert the audio code into the object 112. This can include modifying the object 112 to include the movement instructions in the audio code. In one example, the audio code can include multiple audio snippets, and the audio snippets can be inserted into the object 112 at different locations of its G-code. The placement of the audio snippet in the G-code can affect when the 3D printer 120 executes the audio snippet. For example, the 3D printer 120 can execute G-code instructions in sequential order, and the print server 100 can insert the audio snippets at specific locations in the G-code so that it knows when each audio snippet should be executed during the print job.

At stage 508, the print server 100 can send the object 112 to the 3D printer 120. In another example, the print server 100 can encrypt the object 112 with a private key before sending the object 112, and the 3D printer 120 can have a public key that allows it to decrypt the object 112. The 3D printer 120 can then begin printing the object 112 at stage 510.

At stage 510, the 3D printer 120 can being printing the object 112, and at stage 512, the recording device 130 can record audio of the 3D printer 130 printing the object 112. The order of stages 510 and 512 is not relevant, but these stages can begin simultaneously so that the recording device 130 can record the entirety of the printing job. The recording device 130 can generate an audio file of the print job, such as an .mp3, .m4a, or .wav file.

At stage 514, the recording device 130 can send an audio file of the recording to the print server 100. In an example, the recording device 130 can upload the audio file to the print server 100 as it is generated so that the print server 100 receives the audio in real-time. As the print server 100 receives the audio file, it can compare the audio file to the audio code at stage 516. In an example, the print server 100 can store information relating to the timing of the 3D printer 120 printing the object 112. Such information can include how long the entire printing job should take and how long each instructional step in the G-code should take, for example. The print server 100 can use the information to determine when the 3D printer 120 should execute each audio snippet instruction relative to the starting time of the print job. Because 3D printer models print at different speeds, the timing information can be specific to the model of the 3D printer 120.

Using the timing information, at stage 518 the print server 100 can ensure that the audio snippet instructions are being executed properly and at the correct times during the printing. For example, for each inserted audio snippet the print server 100 can verify that the 3D printer 120 emits the correct sequence of sounds. However, because G-code files can be quite large and include thousands of instructions, a hacker likely may change a part of the G-code file that does not correspond to an audio snippet. For this reason, the print server 100 can also check the time interval between the printing of each audio snippet. If the time interval falls outside an allowable threshold, then the server can determine that the G-code file may have been tampered with.

At stage 518, if the print server 100 determines that the audio file and audio code match, the print server 100 can take no additional action, and at stage 520 the stages can return to the print server 100 receiving the audio file at stage 514.

At stage 522, if the print server 100 determines that the audio file and audio code do not match, the print server 100 can send instructions to the 3D printer 120 to cancel the printing job. The print server 100 can also notify the user device 140 that the 3D printing job was canceled because the job could not be verified. In one example, the print server 100 can also notify an administrator so that the administrator can further analyze the printing job to determine if a hack has occurred. Because 3D printing jobs can often take many hours to complete, stopping the 3D printing job mid-execution can save significant time and resources, and a solution can be found much sooner.

In some examples, instead of canceling the print job, the print server 100 can finish printing the object 112 and notify the user that print job could not be verified. The user can then decide whether to use the object as printed or print the object 112 again. In one example, when sending a print request, the user can be prompted to choose what action should be taken if the print server 100 cannot verify the print job. For example, the user can choose whether to continue or cancel the print job if the print server 100 determines mid-printing that the print job cannot be verified. In one example, the print server 100 can send new instructions that cause the 3D printer 120 can alter the print job so that it prints to a default shape (e.g., a sphere) by adding more material to different portions of the object as needed to create the shape.

At stage 524, the 3D printer 120 can stop printing the object 112. In an example where the print server 100 cannot verify the printing job, the 3D printer 120 can stop printing in response to instructions from the print server 100. In an example where the print server 100 verifies the printing job through its entirety, the 3D printer 120 can stop printing the object 112 at completion of the print job.

The systems and methods disclosed herein can have additional uses beyond verifying a current print job. As an example, the described audio snippets can serve as a watermark for object files. If an object file is stolen and used without permission, the proper owner of the file, having inserted the audio snippet instructions, can perhaps prove the theft by showing that the object file includes the custom audio snippets. This can be determined by printing the object and recording audio of the printer using methods described herein or by simply reviewing the G-code to extract the audio snippets, as a few examples.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for verifying a three-dimensional (3D) printing job, comprising:
   receiving a request to print an object at a 3D printer;
   generating an audio code for causing one or more components of the 3D printer to perform extra movements during the 3D printing job without using any printing material and then return the one or more components to their pre-audio position without affecting the object;
   inserting the audio code into a printing file for the object;
   receiving an audio file of the 3D printer printing the object; and
   verifying the printed object based on the audio file and the audio code.

2. The method of claim 1, wherein the audio code is inserted into the printing file at random intervals.

3. The method of claim 1, wherein, in an instance where the audio file does not match audio associated with the audio code, providing a notification that the printed object cannot be verified.

4. The method of claim 3, wherein the audio file is received while the 3D printer prints the object, and the method further comprises:
   determining, while the 3D printer is printing the object, the audio file does not match the audio associated with the audio code; and
   providing instructions to the 3D printer to cancel the printing.

5. The method of claim 1, further comprising sending the printing file to the 3D printer, wherein a recording device records audio of the 3D printer printing the object, and the audio file is received from the recording device.

6. The method of claim 1, further comprising:
   receiving a video file of the 3D printer printing the object;
   in an instance where the audio file does not match audio associated with the audio code, comparing the video file to video associated with the audio code to verify the printed object.

7. The method of claim 1, further comprising adding an expiration date to the printing file, wherein the 3D printer is configured to reject a printing job with the printing file after the expiration date.

8. A non-transitory, computer-readable medium containing instructions that, when executed by a hardware-based processor, performs stages for verifying a three-dimensional (3D) printing job, the stages comprising:
   receiving a request to print an object at a 3D printer;
   generating an audio code for causing one or more components of the 3D printer to perform extra movements during the 3D printing job without using any printing material and then return the one or more components to their pre-audio position without affecting the object;
   inserting the audio code into a printing file for the object;
   receiving an audio file of the 3D printer printing the object; and
   verifying the printed object based on the audio file and the audio code.

9. The non-transitory, computer-readable medium of claim 8, wherein the audio code is inserted into the printing file at random intervals.

10. The non-transitory, computer-readable medium of claim 8, wherein, in an instance where the audio file does not match audio associated with the audio code, the stages further comprise providing a notification that the printed object cannot be verified.

11. The non-transitory, computer-readable medium of claim 8, wherein the audio file is received while the 3D printer prints the object, and the stages further comprise:
   determining, while the 3D printer is printing the object, the audio file does not match the audio associated with the audio code; and
   providing instructions to the 3D printer to cancel the printing.

12. The non-transitory, computer-readable medium of claim 8, the stages further comprising sending the printing file to the 3D printer, wherein a recording device records audio of the 3D printer printing the object, and the audio file is received from the recording device.

13. The non-transitory, computer-readable medium of claim 8, the stages further comprising:
   receiving a video file of the 3D printer printing the object;
   in an instance where the audio file does not match audio associated with the audio code, comparing the video file to video associated with the audio code to verify the printed object.

14. The non-transitory, computer-readable medium of claim 8, the stages further comprising adding an expiration date to the printing file, wherein the 3D printer is configured to reject a printing job with the printing file after the expiration date.

15. A system for verifying a three-dimensional (3D) printing job, comprising:
   a memory storage including a non-transitory, computer-readable medium comprising instructions; and
   a computing device including a hardware-based processor that executes the instructions to carry out stages comprising:
     receiving a request to print an object at a 3D printer;
     generating an audio code for causing one or more components of the 3D printer to perform extra movements during the 3D printing job without using any printing material and then return the one or more components to their pre-audio position without affecting the object;
     inserting the audio code into a printing file for the object;
     receiving an audio file of the 3D printer printing the object; and
     verifying the printed object based on the audio file and the audio code.

16. The system of claim 15, wherein the audio code is inserted into the printing file at random intervals.

17. The system of claim 15, wherein, in an instance where the audio file does not match audio associated with the audio code, the stages further comprise providing a notification that the printed object cannot be verified.

18. The system of claim 15, wherein the audio file is received while the 3D printer prints the object, and the stages further comprise:
   determining, while the 3D printer is printing the object, the audio file does not match the audio associated with the audio code; and
   providing instructions to the 3D printer to cancel the printing.

19. The system of claim 15, the stages further comprising sending the printing file to the 3D printer, wherein a recording device records audio of the 3D printer printing the object, and the audio file is received from the recording device.

20. The system of claim 15, the stages further comprising:
   receiving a video file of the 3D printer printing the object;
   in an instance where the audio file does not match audio associated with the audio code, comparing the video file to the audio code to verify the printed object.

\* \* \* \* \*